(12) United States Patent
Binetti et al.

(10) Patent No.: US 11,008,921 B1
(45) Date of Patent: May 18, 2021

(54) SELECTIVE CATALYTIC REDUCTION DEVICE CONTROL

(71) Applicant: GM Global Technology Operations LLC, Detroit, MI (US)

(72) Inventors: Giulio Binetti, Turin (IT); Giuseppe Mazzara Bologna, Turin (IT); Daniela Meola, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 20 days.

(21) Appl. No.: 16/676,019

(22) Filed: Nov. 6, 2019

(51) Int. Cl.
*F01N 3/20* (2006.01)
*F01N 9/00* (2006.01)

(52) U.S. Cl.
CPC ............. *F01N 9/005* (2013.01); *F01N 3/208* (2013.01); *F01N 2560/021* (2013.01); *F01N 2560/026* (2013.01); *F01N 2560/07* (2013.01)

(58) Field of Classification Search
CPC ........ F01N 3/208; F01N 3/2066; F01N 9/005; F01N 2560/07; F01N 2560/026; F01N 2560/021; F01N 2610/02; F01N 2610/1453; Y02T 10/12; Y02T 10/40
USPC .................... 60/274, 277, 286, 295, 299–301
See application file for complete search history.

(56) References Cited

U.S. PATENT DOCUMENTS

| | | |
|---|---|---|
| 4,161,929 A | 7/1979 | Nohira et al. |
| 5,101,786 A | 4/1992 | Kamio et al. |
| 5,706,780 A | 1/1998 | Shirakawa |
| 5,727,528 A | 3/1998 | Hori et al. |
| 5,775,293 A | 7/1998 | Kresse |
| 5,921,219 A | 7/1999 | Frohlich et al. |
| 6,014,955 A | 1/2000 | Hosotani et al. |
| 6,155,230 A | 12/2000 | Iwano et al. |

(Continued)

FOREIGN PATENT DOCUMENTS

| | | |
|---|---|---|
| CN | 1594846 A | 3/2005 |
| WO | 2003065135 A1 | 8/2003 |

OTHER PUBLICATIONS

John C.G. Boot, "Quadratic Programming: Algorithms, Anomalies, Applications, vol. 2 of Studies in Mathematical and Managerial Economics," North Holland Publ. Comp., 1964; 213 pages.

(Continued)

*Primary Examiner* — Audrey K Bradley
*Assistant Examiner* — Dapinder Singh
(74) *Attorney, Agent, or Firm* — Vivacqua Crane PLLC

(57) ABSTRACT

Technical solutions described herein include an emissions control system for treating exhaust gas in a motor vehicle including an internal combustion engine. The emissions control system includes a model-based controller to control reductant injections into the exhaust gas. Controlling the reductant injections includes determining an amount of NOx and an amount of NH3 at an outlet of the first SCR device, and at an outlet of the second SCR device. The controlling further includes computing an amount of reductants to inject to maintain a first predetermined ratio between the amount of NH3 and the amount of NOx at the outlet of the first SCR device and to maintain a second predetermined ratio between the amount of NH3 and the amount of NOx at the outlet of the second SCR device. Further, the controlling includes sending a command for receipt by the reductant injectors to inject the computed amount of reductants.

20 Claims, 2 Drawing Sheets

(56) References Cited

U.S. PATENT DOCUMENTS

| | | |
|---|---|---|
| 6,173,226 B1 | 1/2001 | Yoshida |
| 6,276,333 B1 | 8/2001 | Kazama et al. |
| 6,532,935 B2 | 3/2003 | Ganser et al. |
| 6,606,981 B2 | 8/2003 | Itovama |
| 6,704,638 B2 | 3/2004 | Livshiz et al. |
| 6,704,641 B2 | 3/2004 | Tashiro et al. |
| 6,826,904 B2 | 12/2004 | Miura |
| 6,840,215 B1 | 1/2005 | Livshiz et al. |
| 6,953,024 B2 | 10/2005 | Linna et al. |
| 6,993,901 B2 | 2/2006 | Shirakawa |
| 7,016,779 B2 | 3/2006 | Bowyer |
| 7,021,282 B1 | 4/2006 | Livshiz et al. |
| 7,051,058 B2 | 5/2006 | Wagner et al. |
| 7,222,012 B2 | 5/2007 | Simon, Jr. |
| 7,235,034 B2 | 6/2007 | Berglund et al. |
| 7,236,874 B2 | 6/2007 | Ichihara |
| 7,274,986 B1 | 9/2007 | Petridis et al. |
| 7,275,518 B1 | 10/2007 | Gartner et al. |
| 7,356,403 B2 | 4/2008 | Yoshioka et al. |
| 7,395,147 B2 | 7/2008 | Livshiz et al. |
| 7,400,967 B2 | 7/2008 | Ueno et al. |
| 7,433,775 B2 | 10/2008 | Livshiz et al. |
| 7,441,544 B2 | 10/2008 | Hagari |
| 7,546,196 B2 | 6/2009 | Izumi et al. |
| 7,563,194 B2 | 7/2009 | Murray |
| 7,614,384 B2 | 11/2009 | Livshiz et al. |
| 7,698,048 B2 | 4/2010 | Jung |
| 7,703,439 B2 | 4/2010 | Russell et al. |
| 7,715,975 B2 | 5/2010 | Yamaoka et al. |
| 7,775,195 B2 | 8/2010 | Schondorf et al. |
| 7,777,439 B2 | 8/2010 | Falkenstein |
| 7,813,869 B2 | 10/2010 | Grichnik et al. |
| 7,885,756 B2 | 2/2011 | Livshiz et al. |
| 7,941,260 B2 | 5/2011 | Lee et al. |
| 7,949,459 B2 | 5/2011 | Yoshikawa et al. |
| 7,967,720 B2 | 6/2011 | Martin et al. |
| 7,967,729 B2 | 6/2011 | Martin et al. |
| 7,975,668 B2 | 7/2011 | Ramappan et al. |
| 7,980,221 B2 | 7/2011 | Baur et al. |
| 8,010,272 B2 | 8/2011 | Kuwahara et al. |
| 8,027,780 B2 | 9/2011 | Whitney et al. |
| 8,041,487 B2 | 10/2011 | Worthing et al. |
| 8,050,841 B2 | 11/2011 | Costin et al. |
| 8,073,610 B2 | 12/2011 | Heap et al. |
| 8,078,371 B2 | 12/2011 | Cawthorne |
| 8,086,390 B2 | 12/2011 | Whitney et al. |
| 8,103,425 B2 | 1/2012 | Choi et al. |
| 8,103,428 B2 | 1/2012 | Russ et al. |
| 8,116,954 B2 | 2/2012 | Livshiz et al. |
| 8,121,763 B2 | 2/2012 | Hou |
| 8,176,735 B2 | 5/2012 | Komatsu |
| 8,181,627 B2 | 5/2012 | Sharples et al. |
| 8,209,102 B2 | 6/2012 | Wang et al. |
| 8,209,104 B2 | 6/2012 | Soejima et al. |
| 8,219,304 B2 | 7/2012 | Soma |
| 8,241,177 B2 | 8/2012 | Doering et al. |
| 8,307,814 B2 | 11/2012 | Leroy et al. |
| 8,316,828 B2 | 11/2012 | Whitney et al. |
| 8,447,492 B2 | 5/2013 | Watanabe et al. |
| 8,468,821 B2 | 6/2013 | Liu et al. |
| 8,483,935 B2 | 7/2013 | Whitney et al. |
| 8,527,120 B2 | 9/2013 | Matthews et al. |
| 8,560,204 B2 | 10/2013 | Simon et al. |
| 8,566,008 B2 | 10/2013 | Soejima et al. |
| 8,593,806 B2 | 11/2013 | Huang |
| 8,594,904 B2 | 11/2013 | Livshiz et al. |
| 8,635,001 B2 | 1/2014 | Doering et al. |
| 8,739,766 B2 | 6/2014 | Jentz et al. |
| 8,744,716 B2 | 6/2014 | Kar |
| 8,862,248 B2 | 10/2014 | Yasui |
| 8,954,257 B2 | 2/2015 | Livshiz et al. |
| 8,977,457 B2 | 3/2015 | Robinette et al. |
| 9,031,766 B2 | 5/2015 | DeLaSalle et al. |
| 9,062,631 B2 | 6/2015 | Kinugawa et al. |
| 9,067,593 B2 | 6/2015 | Dufford |
| 9,075,406 B2 | 7/2015 | Nakada |
| 9,145,841 B2 | 9/2015 | Miyazaki et al. |
| 9,175,622 B2 | 11/2015 | Seiberlich et al. |
| 9,175,628 B2 | 11/2015 | Livshiz et al. |
| 9,222,426 B2 | 12/2015 | Rollinger et al. |
| 9,243,524 B2 | 1/2016 | Whitney et al. |
| 9,328,671 B2 | 5/2016 | Whitney et al. |
| 9,334,815 B2 | 5/2016 | Cygan, Jr. et al. |
| 9,347,381 B2 | 5/2016 | Long et al. |
| 9,376,965 B2 | 6/2016 | Whitney et al. |
| 9,378,594 B2 | 6/2016 | Wong et al. |
| 9,382,865 B2 | 7/2016 | Genslak et al. |
| 9,388,754 B2 | 7/2016 | Cygan, Jr. et al. |
| 9,388,758 B2 | 7/2016 | Pochner et al. |
| 9,399,959 B2 | 7/2016 | Whitney et al. |
| 9,429,085 B2 | 8/2016 | Whitney et al. |
| 9,435,274 B2 | 9/2016 | Wong et al. |
| 9,447,632 B2 | 9/2016 | LeBlanc |
| 9,528,453 B2 | 12/2016 | Whitney et al. |
| 9,534,547 B2 | 1/2017 | Livshiz et al. |
| 9,541,019 B2 | 1/2017 | Verdejo et al. |
| 9,587,573 B2 | 3/2017 | Genslak et al. |
| 9,599,049 B2 | 3/2017 | Zavala Jurado et al. |
| 9,599,053 B2 | 3/2017 | Long et al. |
| 9,605,615 B2 | 3/2017 | Long et al. |
| 9,669,822 B2 | 6/2017 | Piper et al. |
| 9,714,616 B2 | 7/2017 | Jin et al. |
| 9,732,499 B2 | 8/2017 | Miyamoto et al. |
| 9,732,688 B2 | 8/2017 | Cygan, Jr. et al. |
| 9,765,703 B2 | 9/2017 | Whitney et al. |
| 9,784,198 B2 | 10/2017 | Long et al. |
| 9,789,876 B1 | 10/2017 | Livshiz et al. |
| 9,797,318 B2 | 10/2017 | Storch et al. |
| 9,863,345 B2 | 1/2018 | Wong et al. |
| 9,920,697 B2 | 3/2018 | Pochner et al. |
| 9,927,780 B2 | 3/2018 | Sun et al. |
| 9,963,150 B2 | 5/2018 | Livshiz et al. |
| 9,989,150 B2 | 6/2018 | Yamanaka et al. |
| 10,047,686 B2 | 8/2018 | Jin |
| 10,094,300 B2 | 10/2018 | Cygan, Jr. et al. |
| 10,119,481 B2 | 11/2018 | Livshiz et al. |
| 10,125,712 B2 | 11/2018 | Livshiz et al. |
| 10,167,746 B2 | 1/2019 | Whitney et al. |
| 10,196,956 B2 | 2/2019 | Alfieri et al. |
| 10,273,900 B2 | 4/2019 | Whitney et al. |
| 10,358,140 B2 | 7/2019 | Livshiz et al. |
| 10,399,574 B2 | 9/2019 | Livshiz et al. |
| 10,450,972 B2 | 10/2019 | Pochner et al. |
| 10,690,033 B1* | 6/2020 | Johnson ............... F01N 9/002 |
| 2004/0116220 A1 | 6/2004 | Yamamoto et al. |
| 2005/0065691 A1 | 3/2005 | Cho |
| 2007/0191181 A1 | 8/2007 | Burns |
| 2009/0288899 A1 | 11/2009 | Belloso |
| 2010/0211294 A1 | 8/2010 | Soejima |
| 2011/0053720 A1 | 3/2011 | Kang et al. |
| 2012/0010860 A1 | 1/2012 | Kirkling et al. |
| 2013/0111886 A1* | 5/2013 | Gonze ............... F01N 3/2033 60/286 |
| 2014/0363358 A1* | 12/2014 | Udd ............... B01D 53/9431 423/212 |
| 2017/0016407 A1 | 1/2017 | Whitney et al. |
| 2017/0082055 A1 | 3/2017 | Cygan, Jr. et al. |
| 2017/0114690 A1* | 4/2017 | Gupta ............... B01D 53/9431 |
| 2018/0230878 A1* | 8/2018 | Takada ............... B01D 53/9418 |
| 2018/0293814 A1 | 10/2018 | Gilbert et al. |
| 2019/0301387 A1 | 10/2019 | Jin et al. |
| 2019/0308626 A1 | 10/2019 | Otanez et al. |
| 2019/0353071 A1 | 11/2019 | Camuglia et al. |

OTHER PUBLICATIONS

N. Lawrence Ricker, "Use of Quadratic Programming for Constrained Internal Model Control," Ind. Eng. Chem. Process Des. Dev., 1985, pp. 925-936.

C. E. Lemke, "A Method of Solution for Quadratic Programs," Rensselaer Polytechnic Institute, Troy, New York, Published Online: Jul. 1, 1962, pp. 442-453.

(56) References Cited

OTHER PUBLICATIONS

Kolmanovsky I., "Towards Engine and Powertrain Control Based on Model Predictive Control," Sep. 28, 2012, Powerpoint Presentation, 47 slides.
Gorinevsky, Lecture 14—Model Predictive Control Part 1: The Concept, Spring 2005, Powerpoint Presentation, 26 slides.
Bemporad, Alberto, "Model Predictive Control," Spring 2005, Powerpoint Presentation, 94 slides.
Boyd, S., "Model Predictive Control," Powerpoint Presentation, 25 slides.
U.S. Appl. No. 16/174,670, filed Oct. 30, 2018 by GM Global Technology Operations LLC, titled "Steady State Control of Model Predictive Control Based Powertrain With Continuously Variable Transmission".
U.S. Appl. No. 16/272,568, filed Feb. 11, 2019 by GM Global Technology Operations LLC, titled "Model Predictive Control of Torque Converter Clutch Slip".
U.S. Appl. No. 16/418,658, filed May 21, 2019 by GM Global Technology Operations LLC, titled "Method for Increasing Control Cost Functions".
U.S. Appl. No. 16/551,064, filed Aug. 26, 2019 by GM Global Technology Operations LLC, titled "Enhanced Engine Coolant Flow Control of the Active Thermal Management System".
U.S. Appl. No. 16/665,519, filed Oct. 28, 2019 by GM Global Technology Operations LLC, titled "Combustion Apparatus and Method for Operating an Internal Combustion Engine".

* cited by examiner

SELECTIVE CATALYTIC REDUCTION DEVICE CONTROL

INTRODUCTION

The present disclosure relates to exhaust systems for internal combustion engines, and more particularly to exhaust systems using selective catalytic reduction (SCR) units for emissions control.

Exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("NOx") as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components.

Exhaust gas treatment systems typically include selective catalytic reduction (SCR) devices. An SCR device includes a substrate having an SCR catalyst disposed thereon to reduce the amount of NOx in the exhaust gas. The typical exhaust treatment system also includes a reductant delivery system that injects a reductant such as, for example, ammonia (NH3), urea ((NH2)2 CO, etc.). The SCR device makes use of NH3 to reduce the NOx. For example, when the proper amount of NH3 is injected to the SCR device under the proper thermal conditions, the NH3 reacts with the NOx in the presence of the SCR catalyst to reduce the NOx emissions. If the NH3 injection rate is too high, then there is excess of ammonia in the exhaust and, ammonia (NH3) can slip from the SCR. On the other hand, if there is too little ammonia in the exhaust, SCR NOx conversion efficiency will be decreased.

SUMMARY

According to one or more embodiments an emissions control system for treating exhaust gas from an internal combustion engine in a motor vehicle, includes a first reductant injector and a second reductant injector. The emissions control system also includes a first selective catalytic reduction (SCR) device. The emissions control system also includes a second SCR device. The emissions control system further includes a controller to control the first and second reductant injections into the exhaust gas. The controlling of the reductant injections includes determining an amount of NOx and an amount of NH3 at the outlet of the first SCR device. The controlling of the reductant injection further includes determining an amount of NOx and an amount of NH3 at the outlet of the second SCR device. The controlling of the reductant injections further includes computing an amount of reductant to inject to maintain a first predetermined ratio between the amount of NH3 and the amount of NOx at the outlet of the first SCR device and to maintain a second predetermined ratio between the amount of NH3 and the amount of NOx at the outlet of the second SCR device to ensure the optimal operation of both selective catalytic reduction systems, the first SCR device and the second SCR device. The controlling of the reductant injections further includes sending a command for receipt by the reductant injectors to inject the computed amount of reductant.

In one or more examples, determining the amount of NH3 at the outlet of the first SCR device is based on computing a first estimated NH3 storage level for the first SCR device, and is further based on receiving a NOx measurement at the inlet of the first SCR device. In one or more examples, determining the amount of NH3 at the outlet of the second SCR device is based on computing a second estimated NH3 storage level for the second SCR device, and the amount of NH3 at the outlet of the first SCR device as well as the amount of NH3 injected at the inlet of the second SCR device. Determining the amount of NH3 at the outlet of the second SCR device is further based on receiving a NOx measurement at the outlet of the first SCR device. In one or more examples, the first SCR device is a SCR filter. In one or more examples, the second SCR device is an underfloor SCR device. The first reductant injector may be a plurality of first reductant injectors and the second reductant injector may be a plurality of second reductant injectors. In one or more examples, computing the amount of reductants includes estimating the amount of NH3 and the amount of NOx at the outlet of the second SCR device based on an operating model that includes a combination of the first SCR device and the second SCR device.

According to one or more embodiments, an exhaust system for treating exhaust gas emitted by an internal combustion engine, performs a selective catalytic reduction (SCR) of exhaust gas. The exhaust system includes a first SCR device and a controller to control reductant injection into the exhaust gas. The controlling of the reductant injection includes determining if the exhaust system includes a second SCR device and a second reductant injector. In response to the exhaust system including the first SCR device only, the controlling of the reductant injection includes computing an amount of reductant to inject based on a first model of the first SCR device, the first model estimating a first NH3 storage level at the first SCR device. In response to the exhaust system including a second SCR device and a second reductant injector, the controlling of the reductant injections includes computing a first amount of reductant for the first reductant injector to inject and a second amount of reductant for the second reductant injector to inject to maintain a first predetermined ratio between the amount of NH3 and the amount of NOx at the outlet of the first SCR device and to maintain a second predetermined ratio between the amount of NH3 and the amount of NOx at the outlet of the second SCR device to ensure the optimal operation of both selective catalytic reduction systems of the first SCR device and the second SCR device. The controlling further comprises sending a command for receipt by the first and second reductant injectors to inject the computed first and second amounts of reductant.

In one or more examples, the first model uses a first NOx measurement from an inlet of the first SCR device and a second NOx measurement from an outlet of the first SCR device. Further, the second model uses the second NOx measurement from the outlet of the first SCR device and a third NOx measurement from an outlet of the second SCR device. Further yet, in one or more examples, the first model uses a first NH3 estimation from the outlet of the first SCR device and the amount of reductant injected by the first injector. In one or more examples, the second model uses the first NH3 estimation from an outlet of the first SCR device, a second NH3 estimation from an outlet of the second SCR device and the amount of reductant injected by the second reductant injector. In response to the exhaust system including the second SCR device, computing the optimal amount of reductant includes maintaining a first predetermined trade-off between an amount of NH3 and an amount of NOx at the outlet of the first SCR device and to maintain a second predetermined trade-off between an amount of NH3 and an amount of NOx at the outlet of the second SCR device.

According to one or more embodiments a computer-implemented method for controlling a first reductant injection into an emissions control system that includes a first selective catalytic reduction (SCR) device includes determining if the emissions control system includes a second SCR device and a second reductant injector. In response to the exhaust system including the first SCR device only, the controlling of the reductant injection includes computing an amount of reductant to inject based on a first model of the first SCR device, the first model estimating a first NH3 storage level at the first SCR device. In response to the exhaust system including the second SCR device and a second reductant injector, the controlling of the reductant injections includes computing the optimal amount of reductants to inject based on a combination of the first model of the first SCR device and a second model of the second SCR device, the combination estimating the first NH3 storage level at the first SCR device and a second NH3 storage level at the second SCR device. The controlling of the reductant injections further includes sending a command to the reductant injectors to inject the amount of reductants.

In one or more examples, the first model uses a first NOx measurement from an inlet of the first SCR device and a second NOx measurement from an outlet of the first SCR device. Further, the second model uses the second NOx measurement from the outlet of the first SCR device and a third NOx measurement from an outlet of the second SCR device. Further yet, in one or more examples, the first model uses a first NH3 estimation from the outlet of the first SCR device and the amount of reductant injected. In one or more examples, the second model uses the first NH3 estimation from an outlet of the first SCR device, a second NH3 estimation from an outlet of the second SCR device and the amount of reductant injected by the second reductant injector. In response to the exhaust system including the second SCR device, computing the optimal amount of reductants includes maintaining a first predetermined trade-off between an amount of NH3 and an amount of NOx at the outlet of the first SCR device and to maintain a second predetermined trade-off between an amount of NH3 and an amount of NOx at the outlet of the second SCR device.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
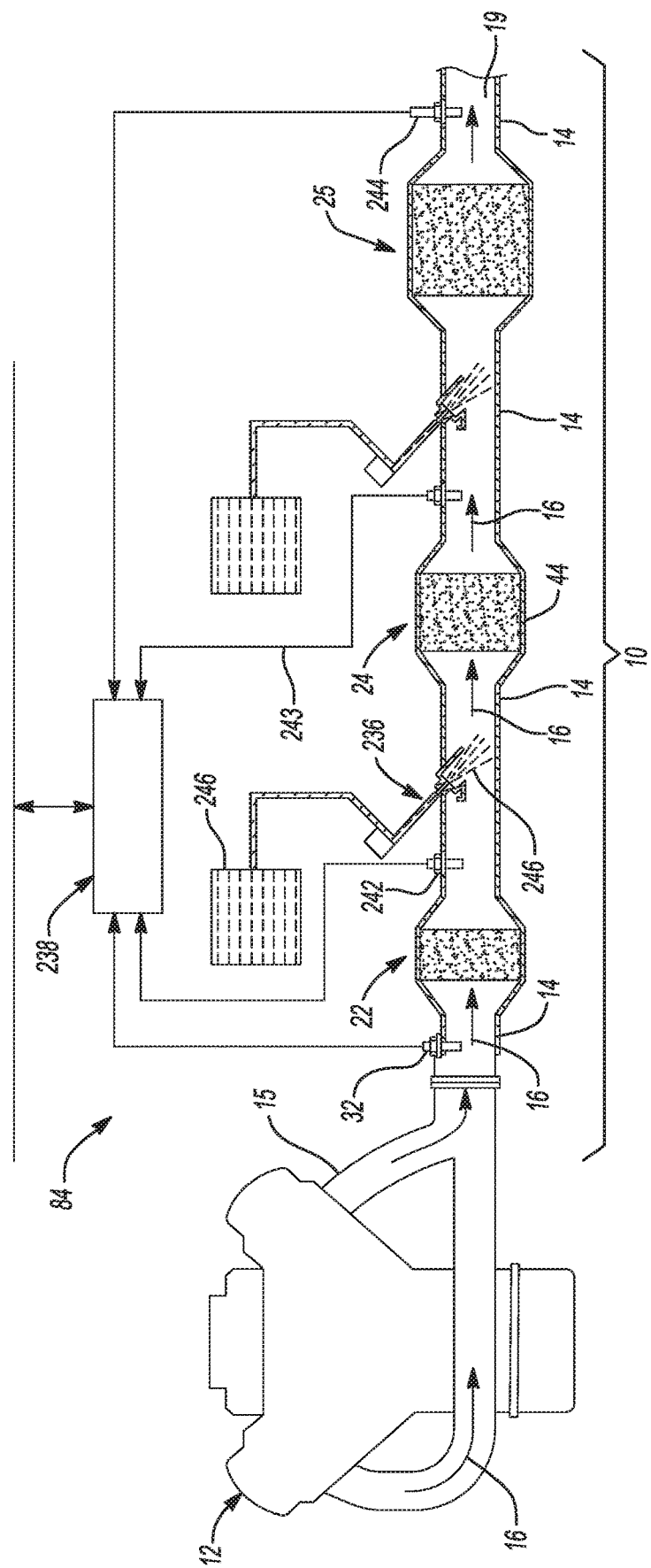
FIG. 1 is a generalized illustration of an engine and an associated exhaust aftertreatment system that is configured to treat the exhaust flow produced by the engine.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

In general, referring to the configuration shown in FIG. 1, a schematic diagram depicts an embodiment of an internal combustion engine 12, a control system 84, and an exhaust gas treatment system 10, in accordance with the one or more embodiments. In the description herein, the engine 12 is described as a diesel engine, however, the engine 12 may be a gasoline engine in one or more examples. The exemplary diesel engine 12 and control system 84 comprises a four-cycle internal combustion diesel engine 12 and electronic engine control module (ECM) 238 that may be configured to accomplish the emission control of exhaust gas flow 16 at tailpipe 19, in accordance with control methods and strategies described herein. The engine may include a known compression-ignition engine having an operating regime that is primarily lean of stoichiometry. Alternatively, diesel engine 12 may include an engine configured to employ any one of a number of engine configurations and associated engine control strategies, and which also includes those having an operational regime (or regimes) that is lean of stoichiometry, e.g., homogeneous-charge compression-ignition engines.

Diesel engine 12 may be any diesel engine configuration or application, including various vehicular applications (e.g., automotive, marine and the like), as well as various non-vehicular applications (e.g., pumps, generators and the like). During operation, diesel engine 12 generates an exhaust gas feedstream or flow represented by arrows 16 containing regulated and unregulated emission constituents, generally including constituent gases and particulate matter. Exhaust gas treatment system 10 acts to convert regulated constituents, such as, for example, various hydrocarbons (HC), carbon monoxide (CO), nitrides of oxygen (NOx) and particulate matter (PM), to unregulated constituents, such as, for example, nitrogen (N2) and water (H2O).

The exhaust gas treatment system 10 contains piping, joints, and other suitable flow passage and connection features that, together, define a contained passage configured to receive the exhaust flow 16 from the engine 12 and discharge a treated exhaust flow 16 from a tailpipe 19. The exhaust gas treatment system 10 includes, as shown, a selective catalytic reduction device (SCR) 24 and an underfloor ammonia-SCR device (uSCR) 25. The exhaust gas treatment system 10 may further include a Diesel Oxidation Catalyst device (DOC) 22. Downstream from the DOC 22, the two SCR devices are connected in series (serial positioning)—the SCR 24 and the uSCR 25 respectively.

The SCR 24 and the uSCR 25 operate cooperatively to decrease NOx emissions, present in the exhaust gas 16 at engine out, to acceptable concentration levels. In general terms, the gaseous emissions originally contained in the exhaust gas 16, are treated to limit the quantity of regulated constituents delivered to the atmosphere. A first urea injector 236 is positioned upstream of the SCR 24 to inject a first amount of urea solution (e.g., AdBlue, DEF) into the exhaust flow 16. Moreover, a second urea injector 237 is positioned upstream of the uSCR 25 to inject a second amount of urea solution (e.g. AdBlue, DEF) into the exhaust flow 16.

The diesel engine 12 is fluidly coupled to an outlet manifold 15 that collects the combustion exhaust products discharged from each cylinder in the engine 12 and consolidates them into the exhaust flow 16 that is delivered to the exhaust gas treatment system 10.

The DOC 22 is mounted to the exhaust manifold with an inlet that fluidly communicates directly with the exhaust manifold to receive the exhaust flow 16. The exhaust flow 16 exits the DOC 22 and flows downstream towards the SCR 24, for a first selective catalytic reduction and subsequently to the uSCR 25 for a second selective catalytic reduction.

The DOC 22 may include a combination of platinum (Pt), palladium (Pd), and rhodium (Rh) dispersed as fine particles on a high-surface area base metal oxide such as y-alumina (y-$Al_2O_3$) or a cerium/zirconium oxide ($CeO_2$—$ZrO_2$). In one or more examples, the base metal oxide is also present in the SCR 24 anywhere from about 70 g/L to about 150 g/L of available flow volume over the SCR 24. In further examples, the Pt/Pd/Rh loading on the base metal oxide ranges from about 1 to about 7 g/L of available flow volume over the SCR 24.

In one or more examples, the SCR 24 includes one or more components that utilize a reductant 246 and a catalyst to transform NO and $NO_2$ in the exhaust gas 16. Moreover, in one or more examples, the uSCR 25 includes one or more components that utilize a reductant 247 and a catalyst to transform NO and $NO_2$ in the exhaust gas 16.

The SCR catalyst composition for the SCR 24 and the uSCR 25 is generally a porous and high surface area material, which can operate efficiently to convert NOx constituents in the exhaust gas 16 in the presence of a reductant 246, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a B-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCR catalyst compositions can have high thermal structural stability, particularly when used in tandem with known particulate filter (PF) devices or when incorporated into SCR devices, which are regenerated via high temperature exhaust soot burning techniques.

The SCR catalyst composition for the SCR 24 and the uSCR 25 can optionally further include one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

The uSCR 25 is positioned downstream from the SCR 24 in the under-floor position. In one or more examples, the distance between the SCR 24 and the uSCR 25 ranges from about 3 ft. to about 10 ft. The inlet of the uSCR 25 fluidly communicates with the outlet of the SCR 24 to receive the exhaust flow 16. The outlet of the uSCR 25 communicates the exhaust flow 16 downstream towards the tailpipe opening 19 that emits the exhaust flow to atmosphere.

The uSCR 25 may include fine particles of (1) a base metal ion-substituted zeolite and/or a base metal ion-substituted silicoaluminophosphate and (2) an oxygen storage material. Zeolites and silicoaluminophosphates are open-framework, microporous, and ammonia absorbent polymorphic molecular sieve materials that are preferably ion-substituted with Cu or Fe. The base metal ion-substituted particles are present in the uSCR 25, in total, anywhere from about 120 g/L to about 180 g/L of available flow volume over the uSCR 25, in one or more examples. The oxygen storage material is a metal oxide or a mixed metal oxide that exhibits oxygen storage and release capacity. In one or more examples, the oxygen storage material is present in the uSCR catalyst 25 anywhere from about 5 g/L to about 50 g/L of available flow volume over the uSCR 25. Any suitable distribution of the particulate materials may be employed. The fine particles of the base metal ion-substituted zeolite/silicoaluminophosphate and the oxygen storage material may, for example, be uniformly mixed within a single washcoat layer or, alternatively, relegated to separate and discrete contacting washcoat layers or zones. The oxygen storage material may also be concentrated near the inlet or the outlet of the uSCR 25 or in some other non-uniform distribution.

The base metal ion-substituted zeolites that may be used to prepare the uSCR 25 include a Cu or Fe substituted B-type zeolite, Y-type zeolite, ZSM-5 zeolite, Chabazite zeolite, or USY (ultra-stable Y-type) zeolite. Further, the base metal ion-substituted silicoaluminophosphates (SAPO) that may be used to prepare the uSCR 25 include a Cu or Fe substituted SAPO-5, SAPO-34, or SAPO-44. Some specific metal oxides or mixed metal oxides that may be included in the uSCR 25 as the oxygen storage material are cerium-containing and praseodymium-containing metal oxides or mixed metal oxides such as $CeO_2$, $Pr_6O_{11}$, $CeO_2$—$ZrO_2$, $CuO$—$CeO_2$, $FeO_x$-$CeO_2$ ($1.0 \leq X \leq 1.5$), $MnO_x$—$CeO_2$ ($1.0 \leq X \leq 3.5$), and $Pr_6O_{11}$—$CeO_2$. Each of these materials, without being bound by theory, are believed to have crystal lattice structures that can accommodate non-stoichiometric unit cell quantities of oxygen (both higher and lower) without decomposing. This property equates to an ability to reversibly store and release oxygen in response to the partial pressure of oxygen in the exhaust flow 16 and/or equilibrium shifts that accompany the localized consumption of oxygen during NOx reduction.

When the diesel engine 12 is operating, the exhaust gas treatment system 10 removes the various regulated emissions from the exhaust flow 16 while limiting the amount of ammonia that slips into the exhaust flow 16. The exhaust flow 16 passes, first, through the close-coupled SCR 24 and, second, through the under-floor uSCR 25. The combined catalytic activity of the SCR 24 and the uSCR 25 are able to continuously treat the exhaust flow 16 across a robust variety of engine operating conditions. The initial NOx reduction process takes place at SCR 24 where the NOx exiting DOC 22 reacts with NH3 stored in the SCR 24. Any NOx that escapes past the SCR 24 is reduced at the uSCR 25 with the NH3 stored in the uSCR 25 further reducing levels of NOx concentration in the treated exhaust flow 16. The NH3 stored in SCR 24 and uSCR 25 comes from the first urea injector 236, while the NH3 stored by uSCR 25 comes from SCR 24 and the second urea injector 237, when the NH3 is captured by the uSCR 25. The exhaust gas treatment system 10 further includes a reductant injector system 84 that controls an amount of reductant injected directly into the SCR 24, directly into the uSCR 25 and indirectly into the uSCR 25.

The air/fuel mixture supplied to the engine 12 is constantly adjusted by an electronic fuel injection system (not shown) to achieve a predetermined air to fuel mass ratio, for instance air to fuel ratio may range from 15 to 50, or 15 to 80 on other diesel engine applications. The combustion of the air/fuel mixture in the cylinders of the engine 12 provides the exhaust flow 16 with a relatively large amount of nitrogen (e.g. >70 vol. %), a small amount of oxygen, and unwanted gaseous emissions comprised of carbon monoxide, HC's, and NOx. The amount of oxygen present is generally less than about 2.0 vol. %. The amount of carbon monoxide, HC's and NOx present is typically about 0.8 vol. % or less, about 800 ppm or less, and about 1500 ppm or less, respectively. The NOx constituency of the exhaust flow 16 generally includes a large molar proportion of NO (greater than 90 mol %). It should be noted that above values are examples and that in one or more embodiments, the values may be different than those listed above. It is understood that the above values are exemplary and that in one or more examples, the engine 12 can operate with the above measurements being different than those described herein.

The instantaneous air to fuel mass ratio of the air/fuel mixture, however, may oscillate between 15 to 80 according to the engine calibrations and operating conditions. These oscillations cause the chemical composition of the exhaust flow 16 to vary within particular limits.

The SCR 24 receives the exhaust flow 16 mixed with the NH3 246 injected by the first urea injector 236, and stores the NH3. The NOx gas present in the exhaust gas 16 reacts with the stored NH3. In so doing, the SCR 24 reduces the NOx contained in the exhaust gas 16 to N2 and H2O. In some operative conditions the SCR 24 may slip NH3. The SCR 24 and the second urea injector 237 feed the NH3 to the uSCR 25, to drive a supplemental catalytic NOx reduction reaction when NOx escapes from the first SCR 24. The NH3 stored in SCR 24 and uSCR 25 comes from the first urea injector 236 and the second urea injector 237; the NH3 stored by uSCR 25 coming from the SCR outlet, when the NH3 slips or escapes from SCR 24.

The uSCR 25 receives the exhaust flow 16 from the SCR 24 and the first urea injector 236. The uSCR 25 contributes to a further reduction of the NOx in the exhaust flow 16 by continuously storing the NH3 ammonia slipped from the SCR 24 and injected by the second reductant injector 237, and making it react with the NOx downstream of the SCR 24. The interaction of the two reduction systems SCR 24 and uSCR 25 leads to a substantial reduction of NOx emissions if a suitable amount of reductant 246 and reductant 247 (urea, NH3) has been injected by the first and second urea injectors 236, 237. Any number of events may slightly diminish the NOx conversion efficiency of the SCR 24 and permit NOx to reach the uSCR 25 by way of the exhaust flow 16. The NOx that passes through (i.e. slips) the SCR 24 is reduced by the ammonia stored at the uSCR 25. The ability of the uSCR 25 to accommodate variances in the chemical composition of the exhaust flow 16 and out-of-phase concentration spikes in NOx and ammonia helps limit the escape of these two substances to atmosphere.

The oxygen storage material included in the uSCR 25 provides a reserve oxygen supply that enhances the catalytic reduction reaction between ammonia and NOx. The oxygen storage material absorbs oxygen from the low-oxygen content exhaust flow 16 when NOx is not present. The accumulated oxygen is then extracted to supplement the sparingly available oxygen in the exhaust flow 16. This influx of reserve oxygen achieves NOx reduction efficiency gains in several ways. First, the extra oxygen improves the overall reaction kinetics of the NOx reduction reactions (both NO and $NO_2$) since oxygen scarcity can have a rate-limiting effect. Second, the extra oxygen promotes the oxidation of NO to $NO_2$. This oxidation reaction decreases the NO to $NO_2$ molar ratio of the NOx in the uSCR 25. Such an adjustment is desirable since the overall reduction of NOx generally proceeds more efficiently when the $NO/NO_2$ molar ratio is decreased from that originally produced by the engine 12 to, preferably, about 1.0 (equimolar).

Figure 2:
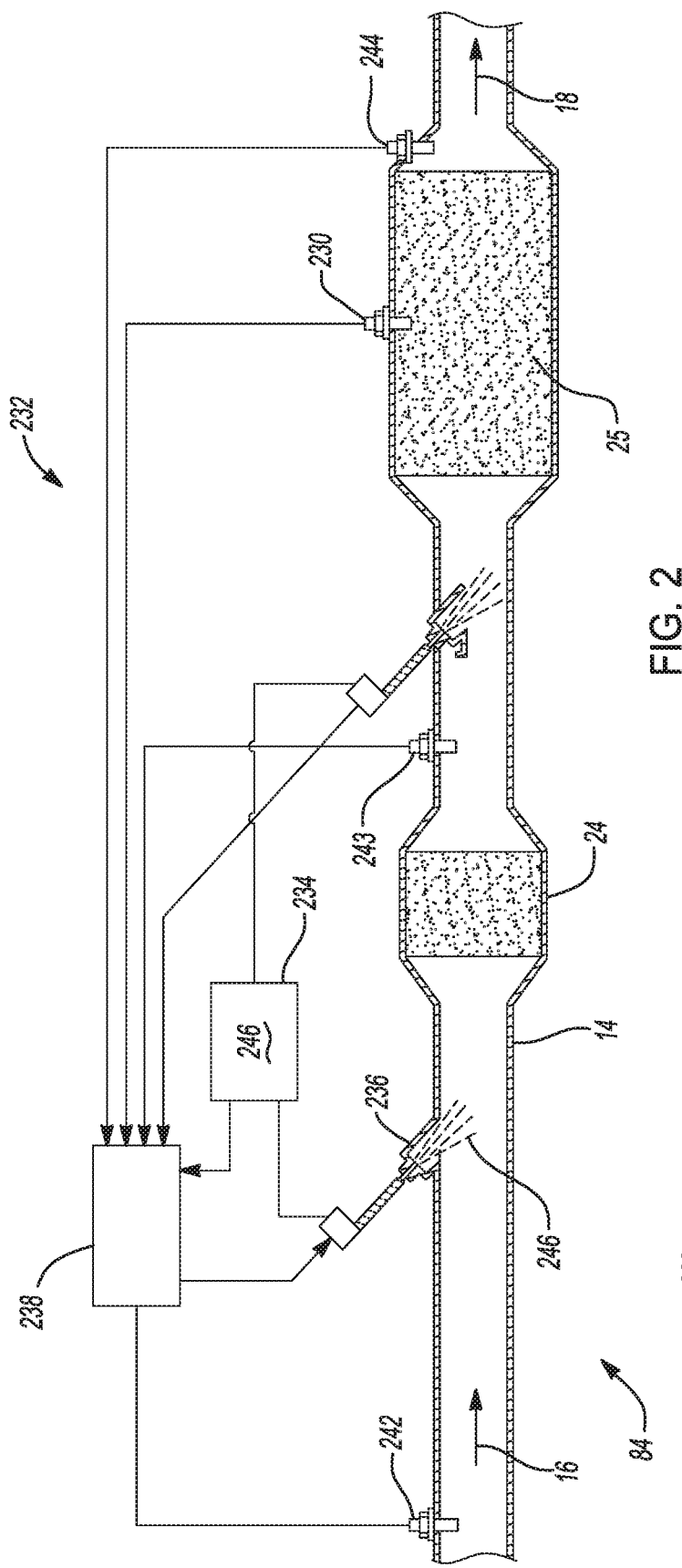
FIG. 2 depicts a block diagram of the reductant injection control system according to one or more embodiments.

FIG. 2 depicts a block diagram of the reductant injection control system 84 according to one or more embodiments. It should be noted that FIG. 2 depicts a simplified view of the exhaust system and does not depict one or more components, such as the DOC 22. It should be further noted that in one or more embodiments the reductant injection control system 84 may include additional components than those depicted, and that the depicted block diagram is to describe the technical solutions herein. The SCR 24 via the first injector 236 and the uSCR 25 via the second injector 237 receive a reductant 246 and reductant 247, such as at variable dosing rates. Reductant 246 and reductant 247 can be supplied from a reductant supply source 234. In one or more examples, the reductant 246 and reductant 247 are injected into exhaust gas conduit 14 at a location upstream of the SCR 24 using the first urea injector 236 and at a location upstream of the uSCR 25 using the second urea injector 237. The reductant 246 and reductant 247 can be in the form of a gas, a liquid, or an aqueous solution, such as an aqueous urea solution. In one or more examples, the reductant 246 and reductant 247 can be mixed with air in the first injector 236 and the second injector 237 to aid in the dispersion of an injected spray. The SCR 24 and the uSCR 25 utilize the reductant 246 and reductant 247 to reduce the NOx in exhaust 16.

The reductant injection control system 84 further includes the control module 238 operably connected, via a number of sensors, to monitor the engine 12, FIG. 1, and the SCR devices 24 and 25. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. For example, the control module 238 can execute a SCR chemical model, as described below. The control module 238 can be operably connected to the engine 12, the SCR 24, the first urea injector 236, the second urea injector 237, the uSCR 25, and/or one or more sensors.

The sensors can include a first $NO_x$ sensor 242, a second $NO_x$ sensor 243, and a third NOx sensor 244, each of which are in fluid communication with the exhaust gas conduit 14. The $NO_x$ sensors 242, 243, 244 detect a $NO_x$ level proximate their location within exhaust gas conduit, and generate a NOx signal, which corresponds to the NOx level. A NOx level can comprise a concentration, a mass flow rate, or a volumetric flow rate, in some embodiments. A NOx signal generated by a NOx sensor can be interpreted by the control module 238, for example. The control module 238 can additionally be in communication with one or more temperature sensors, such as temperature sensor 32, FIG. 1. In one or more examples, the first NOx sensor 242 may be disposed downstream of the engine 12, at DOC inlet or at DOC outlet, to measure the NOx concentration upstream of SCR 24 so as to detect NOx level at the inlet of the SCR 24. In the last case, since a NOx sensor is cross-sensitive to ammonia NH3, the NOx sensor 242 is disposed before the urea injector 236; the second NOx sensor 243 is disposed downstream of the SCR 24 and upstream of both the uSCR 25 and the second urea injector 237 to detect NOx level at the inlet of the uSCR 25 (or the outlet of the SCR 24); and the third NOx sensor 244 is disposed downstream of the uSCR 25 to detect NOx level at the outlet of the uSCR 25. In one or more examples, the first NOx sensor 242 is located upstream of the DOC 22, the second NOx sensor 243 is at the outlet of SCR 24, and the third NOx sensor 244 is at the outlet of uSCR 25. It should be noted that the positions of the sensors depicted in FIG. 2 are illustrative, and that in one or more embodiments, the sensors may be in different positions than those depicted. Further, in one or more embodiments, a different number of sensors may be used than those depicted herein.

The reductant 246 and reductant 247 can be any compound capable of decomposing or reacting in the presence of exhaust gas 16 and/or heat to form ammonia. When the urea is injected via the first and second urea injectors 236, 237 into the hot exhaust gas 16, the water evaporates and the urea thermally decomposes into $NH_3$ and $CO_2$. The NH3 molecules then are stored in SCR 24 or uSCR 25 components to perform the NOx reduction.

Equations (1)-(5) provide exemplary chemical reactions for $NO_x$ reduction involving ammonia.

$$6NO + 4NH_3 \rightarrow 5N_2 + 6H_2O \quad (1)$$

$$4NO + 4NH_3 + O_2 \rightarrow 4N_2 + 6H_2O \quad (2)$$

$$6NO_2 + 8NH_3 \rightarrow 7N_2 + 12H_2O \quad (3)$$

$$2NO_2 + 4NH_3 + O_2 \rightarrow 3N_2 + 6H_2O \quad (4)$$

$$NO + NO_2 + 2NH_3 \rightarrow 2N_2 + 3H_2O \quad (5)$$

It should be appreciated that Equations (1)-(5) are merely illustrative, and are not meant to confine the SCR 24 and the uSCR 25 to a particular NOx reduction mechanism or mechanisms, nor preclude the operation of other mechanisms. The SCR 24 and the uSCR 25 can be configured to perform anyone of the above NOx reduction reactions, combinations of the above NOx reduction reactions, and other NOx reduction reactions.

The reductant 246 and reductant 247 can be diluted with water in various implementations. In implementations where the reductant 246 and reductant 247 are diluted with water, heat (e.g., from the exhaust) evaporates the water, and ammonia is supplied to the SCR 24 and the uSCR 25. Non-ammonia reductants can be used as a full or partial alternative to ammonia as desired. Reaction (6) below provides an exemplary general chemical reaction of ammonia production via evaporation and urea decomposition.

$$(NH_2)_2CO + H_2O \rightarrow 2NH_3 + CO_2 \quad (6)$$

It should be appreciated that Equation (6) is merely illustrative, and is not meant to confine the urea or other reductants 246, 247 decomposition to a particular single mechanism, nor preclude the operation of other mechanisms.

Modeling and optimizing the operation of the two components, SCR 24 and uSCR 25, is a technical challenge addressed by the technical solutions described herein. In addition, the technical solutions described herein facilitate controlling the operation of both, the SCR 24 and the uSCR 25, and the resulting NOx from the exhaust gas treatment system 10, with the first and second reductant (urea) injectors 236, 237 located upstream of SCR 24 and uSCR 25, respectively. The technical solutions accordingly facilitate a systematic and modular control approach to manage, in a flexible way, both the SCR 24 and the uSCR 25 with a single controller module 238. The technical solutions described herein facilitate such flexibility by using a Model Predictive Control (MPC) approach that optimizes overall performance of the exhaust gas treatment system 10, while acting on both the first and second urea injectors 236, 237.

The controller module 238 extends the MPC beyond just the SCR 24 to optimally determine the urea injections while optimizing the trade-off between NOx and NH3 chemical species both at the SCR 24 and uSCR 25 outlets.

Figure 3:
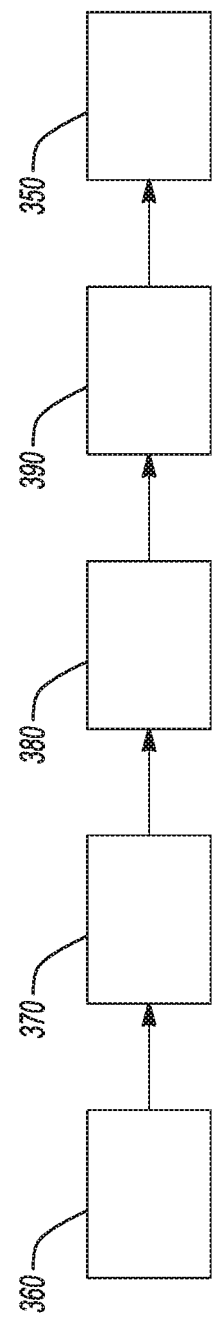
FIG. 3 depicts a flowchart of an example method for determining an amount of reductant to inject into the exhaust system according to one or more embodiments.

FIG. 3 depicts a flowchart of an example method for determining an amount of reductant 246 and reductant 247 to inject into the exhaust gas treatment system 10 according to one or more embodiments. The method 300 is implemented by the controller module 238. In one or more examples, the controller module 238 executes one or more computer executable instructions that are stored on a computer readable storage device to implement the method. Alternatively, or in addition, the implementation includes the controller module 238 operating according to one or more application specific integrated circuits or field programmable gate array configurations.

The method 300 includes reading a set of input signals, at 360. The input set includes the NOx sensor readings from the first NOx sensor 242, the second NOx sensor 243, and the third NOx sensor 244. The set of input signals can further include temperature measurement of the SCR 24 and uSCR 25 measured by the one or more temperature sensors at the respective devices. Further, the input set includes the gas mass flow rates through the SCR 24 and through the uSCR 25.

The method further includes estimating an NH3 and NOx output of the SCR 24, at 370. The estimation includes using an SCR state observer model of the operation of the SCR 24. The SCR state observer may include a model based prediction and correction stage. The estimation includes computing an estimated NH3 storage level of the SCR 24, and further computing an estimate of NOx and an estimate of NH3 at the outlet of the SCR 24. The SCR state estimation uses an SCR physics model given as follows:

$$\begin{cases} x_{SCR}(k+1) = x_{SCR}(k) + \\ \quad T_s \left( \frac{1}{M_{NH3}}(u_1(k) - y_2(k)) - \frac{1}{M_{NOx}}(F_{NOx,in}(k) - y_1(k)) - a_1(k)x_{SCR}(k) \right) \\ y_{1,SCR}(k) = \frac{F(k)F_{NOx,in}(k)}{F(k) + a_2(k)x_{SCR}(k)} \\ y_{2,SCR}(k) = \frac{F(k)(u_1(k) + a_4(k)x_{SCR}(k))}{F(k) + a_5 - a_3 x_{SCR}(k)} \end{cases} \quad (7)$$

Here, $x_{SCR}(k)$ is an estimated NH3 storage level at the SCR 24 at time interval k, $T_s$ is the sampling or scheduling time at which the aftertreatment control module is iterated in control module 238, $u_1(k)$ is the amount of reductant injected at the SCR 24, $y_{1,SCR}$ is the mass flow of NOx at the second NOx sensor 243, and $y_{2,SCR}$ is the mass flow of $NH_3$ at the outlet of the SCR 24. Further, the estimation uses the mass flow of NOx ($F_{NOx,in}(k)$) at the SCR inlet from the first NOx sensors 242. F(k) represents the exhaust flow measurement (it may be an estimate) in the SCR 24 at the k-th time instant. Further, the estimation uses multiple pre-calibrated temperature dependent reaction functions $a_1$-$a_5$. In the above equation $M_{NOx}$ and $M_{NH3}$ represent the molar mass of NOx and the molar mass of NH3, respectively.

Further, the method includes a model based observer to estimate one or more values for the uSCR 25, at 370. The estimation includes computing an NH3 storage level at the uSCR 25. Further, the estimation includes computing NOx and NH3 at the uSCR 25 outlet. The estimations can be based on the following physic-based equation for the uSCR:

$$\begin{cases} x_{uSCR}(k+1) = x_{uSCR}(k) + \\ \quad T_s \left( \dfrac{1}{M_{NH_3}} (F_{NH_3,in,uSCR}(k) - y_{2,uSCR}(k)) - \\ \quad \dfrac{1}{M_{NOx}} (F_{NOx,in,uSCR}(k) - y_{1,uSCR}(k)) \right) \\ y_{1,uSCR}(k) = \dfrac{F(k) F_{NOx,in,uSCR}(k)}{F(k) + a_{2,uSCR}(k) x_{uSCR}(k)} \\ y_{2,uSCR}(k) = \dfrac{F(k)(u_{NH_3,in,uSCR}(k) + a_{4,uSCR}(k) x_{uSCR}(k))}{F(k) + a_{5,uSCR} - a_{3,uSCR} x_{uSCR}(k)} \end{cases} \quad (8)$$

Here, the $F_{NH_3,in,uSCR}(k)$ is the $y_{2,SCR}(k)$ from equation (7) plus the amount of reductant $u_2(k)$ and $F_{NOx,in,uSCR}(k)$ is the $y_{1,SCR}(k)$ from the equation (7). $y_{1,uSCR}(k)$ and $y_{2uSCR}(k)$ represent the mass flow of NOx and NH3 at the uSCR outlet, respectively.

The method 300 further includes optimizing the amount of reductant ($u_1(k)$ and $u_2(k)$) that is injected by the first reductant injector 236 and the second reductant injector 237, at 380. The optimization includes linearizing a combination of the SCR model and the uSCR model from the equations (7) and (9). The linearized model of the combination of the SCR 24 and the uSCR 25 can be expressed as follows:

$$\begin{cases} x(k+1) = A(p(k)) x(k) + B(p(k)) u(k) \\ y(k) = C(p(k)) x(k) \end{cases} \quad (9)$$

Where $$x(k) = \begin{bmatrix} \Theta_{SCR} \theta_{SCR}(k) \\ u_1(k-1) \\ \Theta_{uSCR} \theta_{uSCR}(k) \\ u_2(k-1) \end{bmatrix}$$

$$u(k) = [u_1(k) \quad u_2(k)]$$

$$A(p(k)) = \begin{bmatrix} A_{11}(p(k)) & A_{12}(p(k)) & A_{13}(p(k)) & A_{14}(p(k)) \\ A_{21}(p(k)) & A_{22}(p(k)) & A_{23}(p(k)) & A_{24}(p(k)) \\ A_{31}(p(k)) & A_{32}(p(k)) & A_{33}(p(k)) & A_{34}(p(k)) \\ A_{41}(p(k)) & A_{42}(p(k)) & A_{43}(p(k)) & A_{44}(p(k)) \end{bmatrix}$$

$$B(p(k)) = \begin{bmatrix} B_{11}(p(k)) & B_{12}(p(k)) \\ B_{21}(p(k)) & B_{22}(p(k)) \\ B_{31}(p(k)) & B_{32}(p(k)) \\ B_{41}(p(k)) & B_{42}(p(k)) \end{bmatrix}$$

$$C(p(k)) = \begin{bmatrix} C_{11}(p(k)) & C_{12}(p(k)) & C_{13}(p(k)) & C_{14}(p(k)) \\ C_{21}(p(k)) & C_{22}(p(k)) & C_{23}(p(k)) & C_{24}(p(k)) \\ C_{31}(p(k)) & C_{32}(p(k)) & C_{33}(p(k)) & C_{34}(p(k)) \\ C_{41}(p(k)) & C_{42}(p(k)) & C_{43}(p(k)) & C_{44}(p(k)) \\ C_{51}(p(k)) & C_{52}(p(k)) & C_{53}(p(k)) & C_{54}(p(k)) \\ C_{61}(p(k)) & C_{62}(p(k)) & C_{63}(p(k)) & C_{64}(p(k)) \\ C_{71}(p(k)) & C_{72}(p(k)) & C_{73}(p(k)) & C_{74}(p(k)) \\ C_{81}(p(k)) & C_{82}(p(k)) & C_{83}(p(k)) & C_{84}(p(k)) \end{bmatrix}$$

$$y(k) = \begin{bmatrix} y_{1,SCR}(k) \\ y_{2,SCR}(k) \\ y_{3,SCR}(k) \\ y_{4,SCR}(k) \\ y_{1,uSCR}(k) \\ y_{2,uSCR}(k) \\ y_{3,uSCR}(k) \\ y_{4,uSCR}(k) \end{bmatrix}$$

Here, $\Theta_{SCR}$ is the NH3 storage capacity of the SCR 24, $\theta_{SCR}(k)$ is the NH$_3$ storage level at the SCR 24 at time k, $\Theta_{uSCR}$ is the NH$_3$ storage capacity of the uSCR 25, $\theta_{uSCR}(k)$ is the NH$_3$ storage level at the uSCR 25 at time k.

Referring to the flowchart of FIG. 3 again, the method 300 includes optimizing the amount of reductant ($u_1(k)$ and $u_2(k)$) injected into the exhaust gas 16 by the first and second reductant injectors 236, 237 at 390. The controller computes the amount of reductant ($u_1(k)$ and $u_2(k)$) to be injected into the exhaust gas, to optimally operate the reduction systems SCR 24 and uSCR 25 in order to maintain the NOx and NH3 emissions at the outlet of the SCR 24 and uSCR 25 as low as possible. The optimization includes solving at real time a numerical optimization problem to determine the optimal amount of urea to be injected so as to minimize a cost function that expresses the system performance subject to some constraints. For example, the cost function can include a combination of NOx and NH3 concentrations at SCR outlet and/or uSCR outlet, NOx reduction efficiency, urea injection efforts, and other such parameters described herein.

$$u(k) = \underset{\substack{NH_3_{in,SCR} \\ NH_3_{in,uSCR}}}{\operatorname{argmin}} f \begin{pmatrix} NH_3_{in,SCR}, NH_3_{in,uSCR}, \Delta NH_3_{in,SCR}, \Delta NH_3_{in,uSCR}, \\ NOx_{out,SCR}, NOx_{out,uSCR}, NH_3_{out,SCR}, NH_3_{out,uSCR}, \\ w_i, \rho_{e,SCR}, \rho_{e,uSCR} \end{pmatrix} \quad (10)$$

The constraints are related but not limited to minimum and maximum physical limitation of the first and second reductant injector, physical limitation related to the entire reductant injection system (for example, maximum physical limitation expressed as a linear combination of all reductant injectors or some other combination), control strategy context-based limitations, soft constraints on desired minimum or/and maximum state values, etc.

Here, the terms $w_i$ represent weight calibrations, with $w_u$ being a weight calibration for the amount of urea to be injected NH3$_{in}$ and $w_{du}$ being a weight calibration for ensuring a low variation of the injection pattern of reductant. Further, $w_{NOx,SCR}$ and $w_{NH_3,SCR}$ are weight calibrations based on a tradeoff between NOx and NH3 at outlet of the SCR 24. Further, $w_{NOx,uSCR}$ and $w_{NH_3,uSCR}$ are weight calibrations based on a tradeoff between NOx and NH3 at outlet of the uSCR 25. The control module 238 determines the optimal amount of reductant 246 and reductant 247 to be injected so as to minimize a cost function that expresses the system performance, for example a combination of NOx and NH3 concentrations at SCR 24 outlet, NOx reduction efficiency, urea injection efforts, among other factors, at 390 and 350. The controller module 238 accordingly is responsible for computing an optimal amount of reductant to inject to maintain a first predetermined ratio between the amount of NH3 and the amount of NOx at the outlet of SCR 24 and to maintain a second predetermined ratio between the amount of NH3 and the amount of NOx at the outlet of the uSCR 25.

The optimization can be solved by using linear and nonlinear programming techniques to determine the amount of reductant 246 and reductant 247 to be injected by computing the minimal ($u_1(k)$ and $u_2(k)$) per equation (10). The method 300 hence includes determining the optimal level of reductant 246 and reductant 247 to be injected into the exhaust gas treatment system 10, at 350. In one or more examples, the optimal level of the reductant 246 and reductant 247 is the optimal ($u_1(k)$ and $u_2(k)$) that is computed by optimizing the expressions in equation (10).

The controller module 238 instructs the first injector 236 to inject the corresponding amount of reductant 246 according to the computed $u_1(k)$ value. The injector 236 injects the commanded amount of reductant 246 into the exhaust gas treatment system 10 in response. Moreover, the controller module 238 instructs the second injector 237 to inject the corresponding amount of reductant 247 according to the computed $u_2(k)$ value. The injector 237 injects the commanded amount of reductant 247 into the exhaust gas treatment system 10 in response.

The technical solutions described herein facilitate improvements to emissions control systems used with internal combustion engines, such as those used in vehicles. For example, the technical solutions provide a control strategy that optimizes the overall performance of the exhaust gas treatment system composed of an SCR 24 and a uSCR 25 to maintain tailpipe NOx emissions within a predetermined range, and by using the first and second reductant injectors 236, 237, at 340. Further, the technical solutions facilitate the controller module 238 to operate based on a calibration value that indicates whether the controller module 238 computes an amount of reductant for a combination of both the SCR 24 and the uSCR 25.

The technical solutions described herein accordingly optimize the performance of the entire exhaust gas treatment system 10 including the two SCR devices, the SCR 24 and the uSCR 25, using the first and second reductant injectors 236 and 237. The first reductant injector 236 is controlled to inject a computed amount of reductant that may directly be injected at a first SCR device, such as the SCR 24 and indirectly at the second SCR device, such as the uSCR 25. The second reductant injector 237 is controlled to inject a computed amount of reductant that may directly be injected at a uSCR device, such as the uSCR 25. The reductant amount is computed using a physics-based model and the amount of reductant is computed in real time by solving a numerical programming problem in the ECM processor. Accordingly, the technical solutions described herein provide a systematic and modular control approach to manage, in a flexible way, architectures with two SCR devices, two injectors, and a single optimal controller.

It is to be understood that, in one or more examples, the aftertreatment system may include other additional SCR devices and other reductant injectors in addition to the first and second reductant reactors. Such additional reductant injectors may or may not be disposed in parallel with one of the first and second reductant injectors without departing from the spirit or scope of the present disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An emissions control system for treating exhaust gas from an internal combustion engine in a motor vehicle, the emissions control system comprising:
   a first reductant injector and a second reductant injector;
     a first selective catalytic reduction (SCR) device disposed downstream from the first reductant injector and upstream from the second reductant injector;
     a second SCR device in fluid communication with the first SCR device, the second SCR device disposed downstream from the second reductant injector; and
     a model-based controller that is configured to control the reductant injection into the exhaust gas, the controlling of the reductant injection comprising:
     determining an amount of NOx and an amount of NH3 at an outlet of the first SCR device;
        determining an amount of NOx and an amount of NH3 at an outlet of the second SCR device;
        computing a first amount of reductant for the first reductant injector to inject and a second amount of reductant for the second reductant injector to inject to maintain a first predetermined ratio between the amount of NH3 and the amount of NOx at the outlet of the first SCR device and to maintain a second predetermined ratio between the amount of NH3 and the amount of NOx at the outlet of the second SCR device to ensure the optimal operation of both selective catalytic reduction systems of the first SCR device and the second SCR device; and
        sending a command for receipt by the first and second reductant injectors to inject the computed first and second amounts of reductant.

2. The emissions control system of claim 1, wherein determining the amount of NH3 at the outlet of the first SCR device is based on computing a first estimated NH3 storage level for the first SCR device, and is further based on receiving a NOx measurement at an inlet of the first SCR device.

3. The emissions control system of claim 2, wherein determining the amount of NH3 at the outlet of the second SCR device is based on computing a second estimated NH3 storage level for the second SCR device, and the amount of NH3 at the outlet of the first SCR device.

4. The emissions control system of claim 3, wherein determining the amount of NH3 at the outlet of the second SCR device is further based on receiving a NOx measurement at the outlet of the first SCR device of the first SCR device.

5. The emissions control system of claim 1, wherein the first SCR device is a SCR filter.

6. The emissions control system of claim 5 wherein the second SCR device is an underfloor SCR device,
   wherein the first reductant injector is a plurality of first reductant injectors and wherein the second reductant injector is a plurality of second reductant injectors.

7. The emissions control system of claim 1, wherein computing the amount of reductant comprises estimating the amount of NH3 and the amount of NOx at the outlet of the second SCR device based on a state observer that includes a combination of physical models for the first SCR device and the second SCR device.

8. An exhaust system for treating exhaust gas emitted by an internal combustion engine, configured to perform a selective catalytic reduction (SCR) of exhaust gas, the exhaust system comprising:
a first SCR device disposed downstream from a first reductant injector and upstream from a second reductant injector;
a controller configured to control injection of a reductant into the exhaust gas, the controlling of the first and second reductant injections comprising:
determining if the exhaust system includes a second SCR device;
in response to the exhaust system including the first SCR device only, computing an amount of reductant to inject based on a first model of the first SCR device, the first model estimating a first NH3 storage level at the first SCR device;
in response to the exhaust system including the second SCR device, computing a first amount of reductant for the first reductant injector to inject and a second amount of reductant for the second reductant injector to inject to maintain a first predetermined ratio between the amount of NH3 and the amount of NOx at the outlet of the first SCR device and to maintain a second predetermined ratio between the amount of NH3 and the amount of NOx at the outlet of the second SCR device to ensure the optimal operation of both selective catalytic reduction systems of the first SCR device and the second SCR device; and
sending a command for receipt by the first and second reductant injectors to inject the computed first and second amounts of reductant.

9. The exhaust system of claim 8, wherein the first model uses a first NOx measurement from an inlet of the first SCR device and a second NOx measurement from an outlet of the first SCR device.

10. The exhaust system of claim 9, wherein the second model uses the second NOx measurement from the outlet of the first SCR device and a third NOx measurement from an outlet of the second SCR device.

11. The exhaust system of claim 9, wherein the first model uses a first NH3 estimation from the outlet of the first SCR device and the amount of reductant injected.

12. The exhaust system of claim 11, wherein the second model uses the first NH3 estimation from an outlet of the first SCR device and a second NH3 estimation from an outlet of the second SCR device.

13. The exhaust system of claim 12, wherein, in response to the exhaust system including the second SCR device, computing the optimal amount of reductant comprises maintaining a first predetermined trade-off between an amount of NH3 and an amount of NOx at the outlet of the first SCR device and to maintain a second predetermined trade-off between an amount of NH3 and an amount of NOx at the outlet of the second SCR device.

14. The exhaust system of claim 12, wherein the second SCR device is an underfloor SCR device.

15. A computer-implemented method for controlling reductant injection into an emissions control system that comprises a first selective catalytic reduction (SCR) device, the method comprising:
determining if the emissions control system includes a second SCR device;
in response to the emissions control system including the first SCR device only, computing an optimal amount of reductant to inject based on a first model of the first SCR device, the first model estimating a first NH3 storage level at the first SCR device;
in response to the emissions control system including the second SCR device, computing a first amount of reductant for the first reductant injector to inject and a second amount of reductant for the second reductant injector to inject to maintain a first predetermined ratio between the amount of NH3 and the amount of NOx at the outlet of the first SCR device and to maintain a second predetermined ratio between the amount of NH3 and the amount of NOx at the outlet of the second SCR device to ensure the optimal operation of both selective catalytic reduction systems of the first SCR device and the second SCR device; and
sending a command for receipt by the first and second reductant injectors to inject the computed first and second amounts of reductant.

16. The method of claim 15, wherein the first model uses a first NOx measurement from an inlet of the first SCR device and a second NOx measurement from an outlet of the first SCR device.

17. The method of claim 16, wherein the second model uses the second NOx measurement from the outlet of the first SCR device and a third NOx measurement from an outlet of the second SCR device.

18. The method of claim 15, wherein the first model uses a first NH3 estimation from an outlet of the first SCR device and the amount of reductant injected.

19. The method of claim 15, wherein, in response to the emissions control system including the second SCR device, computing the optimal amount of reductant comprises maintaining a first predetermined ratio between an amount of NH3 and an amount of NOx at a first outlet of the first SCR device and to maintain a second predetermined ratio between an amount of NH3 and an amount of NOx at an outlet of the second SCR device.

20. The method of claim 15, wherein the second SCR device is an underfloor SCR device.

* * * * *